(12) United States Patent
Gama et al.

(10) Patent No.: US 11,444,926 B1
(45) Date of Patent: Sep. 13, 2022

(54) PRIVACY-PRESERVING EFFICIENT SUBSET SELECTION OF FEATURES FOR REGRESSION MODELS IN A MULTI-PARTY COMPUTATION SETTING

(71) Applicant: Inpher, Inc., New York, NY (US)

(72) Inventors: Nicolas Gama, Lausanne (CH); Mariya Georgieva, Nanterre (FR); Dimitar Jetchev, St-Saphorin-Lavaux (CH)

(*) Notice: Subject to any disclaimer, the term of this patent is extended or adjusted under 35 U.S.C. 154(b) by 503 days.

(21) Appl. No.: 16/653,705

(22) Filed: Oct. 15, 2019

Related U.S. Application Data

(60) Provisional application No. 62/745,790, filed on Oct. 15, 2018.

(51) Int. Cl.
*H04L 9/40* (2022.01)
*G06N 20/00* (2019.01)
*G06N 5/04* (2006.01)

(52) U.S. Cl.
CPC .......... *H04L 63/0407* (2013.01); *G06N 5/04* (2013.01); *G06N 20/00* (2019.01)

(58) Field of Classification Search
CPC . H04L 63/0407; H04L 2209/46; H04L 9/085; H04L 63/04; G06N 5/04; G06N 20/00; G06N 3/08; G06F 17/11; G06F 17/16
See application file for complete search history.

(56) References Cited

U.S. PATENT DOCUMENTS

| | | | |
|---|---|---|---|
| 10,296,709 B2* | 5/2019 | Laine | G16B 50/30 |
| 2019/0182216 A1* | 6/2019 | Gulak | H04L 63/0414 |
| 2020/0304293 A1* | 9/2020 | Gama | G06F 17/16 |
| 2022/0092216 A1* | 3/2022 | Mohassel | G06N 3/084 |

OTHER PUBLICATIONS

Boura, et al., "Chimera: a unified framework for B/FV, TFHE and HEAAN fully homomorphic encryption and predictions for deep learning.", URL: https://eprint.iacr.org/2018/758/20180820:181811, Cryptology ePrint Archive, Report 2018/758, 2018., 33 pages.
(Continued)

*Primary Examiner* — Olugbenga O Idowu
(74) *Attorney, Agent, or Firm* — Patent GC LLC; Alexander Franco

(57) ABSTRACT

An efficient method of feature selection for regression models can be implemented in a privacy-preserving manner in a multi-party computation setting. In accordance with various embodiments, the method takes as input data a feature matrix, a dependent variable vector, and an external feature matrix from which a feature is to be selected for addition to a regression model. Some or all of the input data can include private data that can be secret shared during the method so as not to disclose the private data to other parties. Based on two heuristic assumptions, the method determines numerators and denominators for a t-statistics vector in multi-party computations and then calculates the t-statistics vector. In determining the numerators and denominators, the method can determine a baseline Hessian matrix and a vector of predictions. A feature represented in the external feature matrix is then selected based on the calculated t-statistics vector.

15 Claims, 4 Drawing Sheets

(56) References Cited

OTHER PUBLICATIONS

Boura, et al., "High-Precision Privacy-Preserving Real-Valued Function Evaluation", IACR Cryptology ePrint Archive, 2017:1234, 2017, 26 pages.

Brakerski, "Fully Homomorphic Encryption without Modulus Switching from Classical GapSVP", CRYPTO 2012, LNCS, pp. 868-886, 2012.

Chen, et al., "Simple encrypted arithmetic library—SEAL v2.1", Financial Cryptography and Data Security—FC 2017, pp. 3-18, 2017.

Cheon, et al., "Bootstrapping for approximate homomorphic encryption", EUROCRYPT 2018, Proceedings, Part I, vol. 10820 of LNCS, pp. 360-384. Springer, 2018.

Cheon, et al., "Homomorphic encryption for arithmetic of approximate numbers", ASIACRYPT 2017, Proceedings, Part I, vol. 10624 of LNCS, pp. 409-437, Springer, 2017.

Chillotti, et al., "Faster fully homomorphic encryption: Bootstrapping in less than 0.1 seconds", ASIACRYPT 2016, Proceedings, Part I, vol. 10031 of LNCS, pp. 3-33. Springer, 2016.

Chillotti, et al., "TFHE: Fast Fully Homomorphic Encryption over the Torus", IACR Cryptology ePrint Archive, 2018:421.

Ducas, et al., "FHEW: bootstrapping homomorphic encryption in less than a second", EUROCRYPT 2015, Proceedings, Part I, vol. 9056 of LNCS, pp. 617-640. Springer, 2015.

Fan, et al., "Somewhat practical fully homomorphic encryption", IACR Cryptology ePrint Archive, 2012:144, 2012.

Gentry, et al., "Homomorphic encryption from learning with errors: Conceptually-simpler, asymptotically-faster, attribute-based", CRYPTO 2013, Proceedings, Part I, vol. 8042 of LNCS, pp. 75-92, Springer, 2013.

Sikorska, et al., "Gwas on your notebook: fast semi-parallel linear and logistic regression for genome-wide association studies", BMC Bioinformatics 2013, URL: http://www.biomedcentral.com/1471-2105/14/166, vol. 14, No. 166, pp. 11.

Wasserman, "All of Statistics: A Concise Course in Statistical Inference", Springer Publishing Company, Incorporated, 2010.

\* cited by examiner

FIG. 1

Proposition 1. For $1 \leq i \leq m$, let $r_i := S_i^T(\mathbf{y} - \mathbf{p})$ and $s_i = S_i^T W S_i - A_i^T H^{-1} A_i$ where $A_i = X^T W S_i$ and $W = (p_r(1 - p_r))_{r=1}^N$. Under the heuristic assumptions 1. and 2., $$\widehat{\theta}_{k+1}^{(i)} = r_i/s_i \quad \text{and} \quad \sigma_{k+1}^{(i)} = s_i^{-1/2}.$$

In particular, the $t$-stat of $\widehat{\theta}_{k+1}^{(i)}$ is $t_{k+1}^{(i)} = r_i/\sqrt{s_i}$.

*Proof.* The Hessian matrix of the baseline model is the $(k+1)$-by-$(k+1)$ matrix $H = X^T W X$. For $1 \leq i \leq m$, the Hessian matrix of the model $(X^{(i)}, \mathbf{y})$ is the $(k+2)$-by-$(k+2)$ matrix $$H^{(i)} = \left[ \begin{array}{c|c} X^T W^{(i)} X & X^T W^{(i)} S_i \\ \hline S_i^T W^{(i)} X & S_i^T W^{(i)} S_i \end{array} \right].$$

Since $W^{(i)} \simeq W$ (Assumption 1.), we can replace the $W^{(i)}$'s in the above matrix by $W$. Recall that $J^{(i)} := (H^{(i)})^{-1}$. The lower-right diagonal entry is then $$J_{k+2,k+2}^{(i)} = \frac{\det H}{\det H^{(i)}}.$$

But one computes (using orthogonal projections) that $$\frac{\det H^{(i)}}{\det H} = S_i^T W S_i - (S_i^T W X)(X^T X)^{-1}(X^T W S_i),$$

i.e., $\sigma_{k+1}^{(i)} = s_i^{-1/2}$.

To compute the estimator $\widehat{\theta}_{k+1}^{(i)}$, consider the update (in the IRLS algorithm) of the augmented model $\widehat{\theta}^{(i)}$:

$$\widehat{\theta}^{(i)} \leftarrow \widehat{\theta}^{(i)} - J^{(i)} \cdot \text{grad}^{(i)}.$$

Using Assumption 2., $$\widehat{\theta}^{(i)} = (\widehat{\theta}, 0) - J^{(i)} \cdot \text{grad}^{(i)},$$

where $\widehat{\theta}$ is the (unique) solution of the baseline model $(X, \mathbf{y})$. Hence, $\partial L(\theta, 0)/\partial \theta_j = 0$ for $0 \leq j \leq k$ where $L$ denotes the log likelihood cost function for the logisite regression. Hence, $$\text{grad}^{(i)} = (0, ...., 0, S_i^T(\mathbf{y} - \mathbf{p})).$$

Since we assumed that the extended gradient converges in one step, we know exactly the $\widehat{\theta}_{k+1}^{(i)}$ from the update, i.e., $$\widehat{\theta}_{k+1}^{(i)} = -J_{k+2,k+2}^{(i)}(S_i^T(\mathbf{y} - \mathbf{p})) = r_i/s_i.$$

From here, the $t$-stat is $$\left| \theta_{k+1}^{(i)} \right| / \sqrt{J_{k+2,k+2}^{(i)}} = \sqrt{J_{k+2,k+2}^{(i)}}(S_i^T(\mathbf{y} - \mathbf{p})) = r_i/\sqrt{s_i}.$$

$\sigma_{k+1}^{(i)} = J_{k+2,k+2}$ where $J^{(i)} = (H^{(i)})^{-1}$.

1:    $\theta = (0, \ldots, 0)^T$
2:    for $t = 1$ to iters do
3:      $\theta \leftarrow \theta + \text{learning rate} \cdot X^T(y - \sigma(X\theta))$  ⎱ logistic regression for baseline model
4:    end for
5:    $p \leftarrow \sigma(X\theta)$
6:    $r \leftarrow S^T(y - p)^T$  ⎱ numerators for t-statistics
7:    $W \leftarrow \text{diag}(p_i(1 - p_i))_{i=1}^N$
8:    $H \leftarrow X^T W X$  ⎱ baseline Hessian
9:    $A \leftarrow X^T W S$
10:    $s \leftarrow \text{colsums}(W(S \odot S)) - \text{colsums}(A \odot H^{-1} A)$  ⎱ denominators for t-statistics
11:    return $t_{k+1} = (t_{k+1}^{(i)})_{i=1}^m$ where $t_{k+1}^{(i)} = r_i / \sqrt{s_i}$  ⎱ vector of t-statistics Legend:
$(\;)^T$: denotes the transpose of a vector or matrix
iters: number of iterations until minimization of the regression cost function
learning rate: a predetermined constant
$\sigma(\;)$: denotes the sigmoid function
diag( ): denotes the diagonal matrix of values
colsums: take the sum of the elements of each column in a matrix
$\odot$: denotes entrywise product of matrices

PRIVACY-PRESERVING EFFICIENT SUBSET SELECTION OF FEATURES FOR REGRESSION MODELS IN A MULTI-PARTY COMPUTATION SETTING

RELATED APPLICATIONS AND REFERENCES

The subject matter of this application is related to U.S. Provisional Application 62/745,790, filed 2018 Oct. 15, U.S. Provisional Application 62/809,543, filed 2019 Feb. 22, and International Patent Cooperation Treaty Application PCT/US2018/048963, filed 2018 Aug. 30, all of which applications are incorporated herein by reference in their entireties.

A list of related references is also included at the end of this application. These references are referred to in the text below by their associated listing numbers enclosed in square brackets.

SUMMARY OF THE INVENTION

An efficient method of feature selection for regression models can be implemented in a privacy-preserving manner in a multi-party computation setting. In accordance with various embodiments, the method takes as input data a feature matrix, a dependent variable vector, and an external feature matrix from which a feature is to be selected for addition to a regression model. Some or all of the input data can include private data that can be secret shared during the method so as not to disclose the private data to other parties. Based on two heuristic assumptions, the method determines numerators and denominators for a t-statistics vector in multi-party computations and then calculates the t-statistics vector. In determining the numerators and denominators, the method can determine a baseline Hessian matrix and a vector of predictions. A feature represented in the external feature matrix is then selected based on the calculated t-statistics vector.

A method can be performed by one or more computers operating in a secure multi-party privacy-preserving computation setting, each computer having at least one processor and a memory. The method can include: accessing a set of input data including a baseline feature matrix, a dependent variable vector, and an external feature matrix, wherein a portion of the input data is represented as secret shared data; performing a regression on the baseline feature matrix and the dependent variable vector to determine a coefficients vector baseline model; determining numerators for a t-statistics vector based on the baseline feature matrix, the dependent variable vector, the baseline model, and the external feature matrix in a multi-party computation; determining denominators for the t-statistics vector based on the baseline feature matrix, the baseline model, and the external feature matrix in a multi-party computation; computing the t-statistics vector based on the numerators and the denominators for the t-statistics vector; and selecting an external feature represented in the external feature matrix for addition to the baseline feature matrix based on the t-statistics vector, wherein a number of rounds of communication required between parties in the multi-party computations is independent of a size of the external feature matrix.

The method can further include: determining a baseline Hessian matrix based on the baseline feature matrix and the baseline model, wherein the determining the set of denominators is further based on the baseline Hessian matrix.

The method can further include: orthogonalizing the baseline feature matrix prior to determining the baseline Hessian matrix.

The method can further include: determining a vector of predictions for the baseline model based on the baseline feature matrix and the baseline model, wherein the determining the baseline Hessian matrix is further based on the vector of predictions.

The computing the t-statistics vector can be performed in a multi-party computation.

The method can further include: revealing the numerators for the t-statistics vector and the denominators for the t-statistics vector, wherein the computing the t-statistics vector is not performed in a multi-party computation.

The regression can, but need not be performed in a multi-party computation.

The regression can be a logistic regression, a linear regression or another type of regression.

The number of rounds of communication required between parties in the multi-party computations can be further independent of a size of the baseline feature matrix.

The number of rounds of communication required between parties in the multi-party computations can be further independent of a size of the dependent variable vector.

The number of rounds of communication required between parties in the multi-party computations can be independent of the set of input data.

A computer system can include at least one processor and a memory storing instructions that cause the computer system to perform, in coordination with other computer systems operating in a secure multi-party privacy-preserving computation setting, the foregoing method.

A non-transitory computer readable medium can have instructions stored thereon, wherein the instructions, when executed by a computer system having at least one processor, cause the computer system to perform the foregoing method in coordination with other computer systems operating in a secure multi-party privacy-preserving computation setting.

BRIEF DESCRIPTION OF THE DRAWINGS

FIG. 1 illustrates a Proposition 1 and its associated Proof.

FIG. 2 sets out a generic plaintext method.

DETAILED DESCRIPTION

Figure 3:
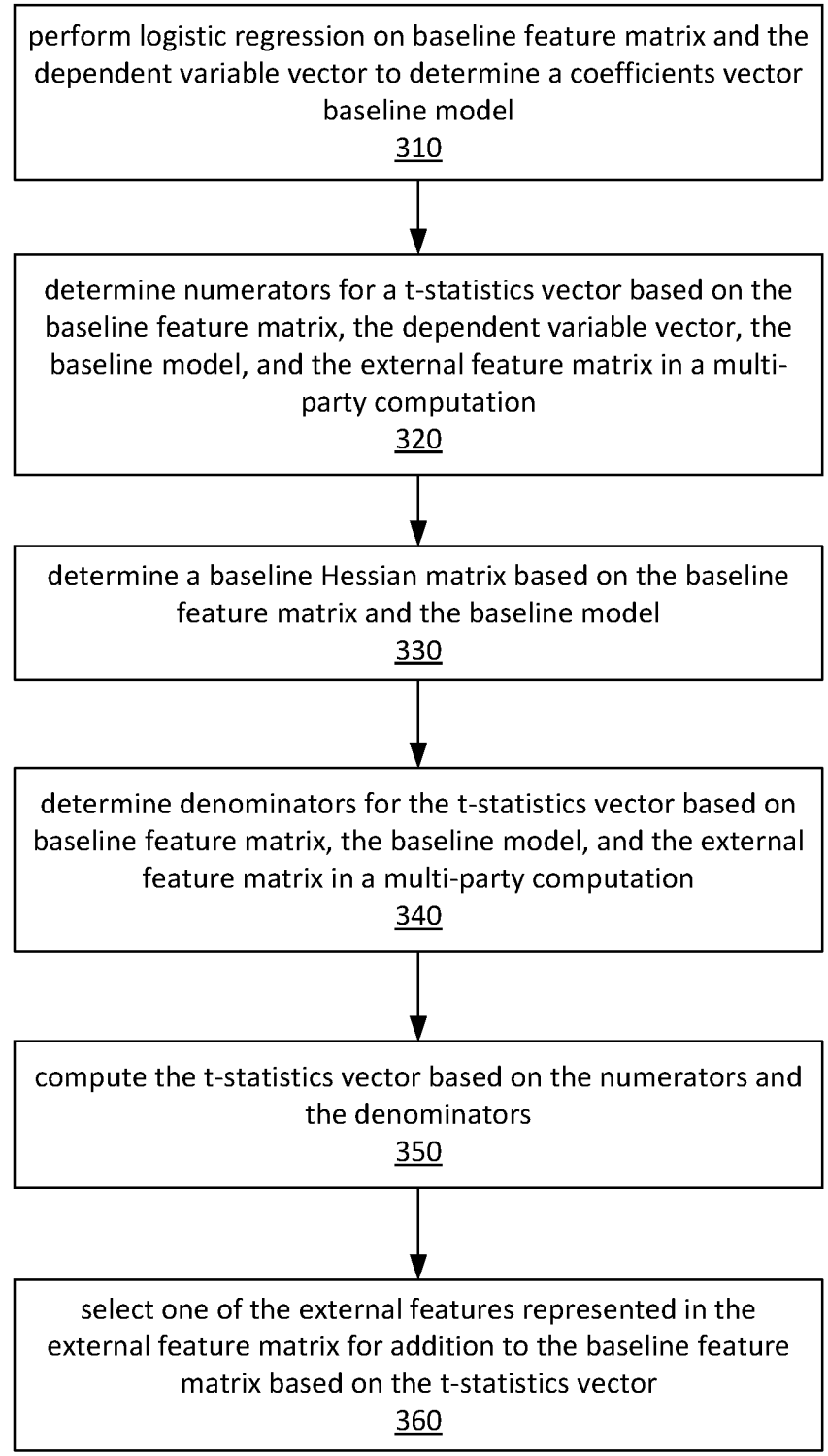
FIG. 3 sets out a multi-party computation implementation.

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

The problem of feature selection for regression models is of central importance in machine and statistical learning. A common setting in practical machine learning scenarios occurs when a data analyst, having trained a regression model with a certain set of features, attempts to improve the model by adding external features. A typical example is a machine learning model used in healthcare for predicting the risk of a patient to suffer from a certain disease (e.g., a heart attack) in the future where training the model for the clinical study might involve external features added to the base model. Since it is not a priori clear which of potentially many external features have predictive quality for the dependent variable, a more systematic method is necessary to measure the quality of the prediction. One common approach for achieving this is the method of p-values and hypotheses testing as in reference [3, Ch.10].

In many scenarios, access to the external training data or external features may be limited due to data privacy restrictions. In the above example, a data analyst may not be able to access patients' personal and confidential medical records, which may be stored by different medical facilities in different secure and/or private systems. The need or requirement to keep certain training data confidential, private or secret makes model training based on such data even more challenging.

Embodiments of certain methods will now be described with respect to identifying an external or additional feature to be added to an existing feature set from a set of external features in a secret privacy-preserving matter in a multi-party computing environment. Although certain methods are set out below primarily with respect to a logistic regression model, the methods can be adapted for use with a linear regression model or other regression models. The methods can be performed by a system such as any of the example computer systems set out towards the end of the detailed description below.

In accordance with one embodiment, a method selects a feature from the columns of an external feature matrix S that would best improve a logistic regression model trained on (X, y), without leaking any information about X, y or S, within the context of a secret multi-party computation. The N×(k+1)-matrix X (referred to herein as the baseline feature matrix) contains data for N data points across k independent features representing an original set of features used in a logistic regression model training. The k independent features correspond to columns of X, N data points correspond to the rows of X, and the first column of X stores an intercept column. The dependent variable vector y includes dependent variable values for each of the N data points. In a logistic (binary) regression, the values of y will represent the actual classifications or labels for the N data points. The auxiliary N×m-matrix S (referred to herein as the external feature matrix) includes data for the N data points across m external features.

Typically, the number of features in the model is much less than the number of external features available (k<<m). In most of the cases, the number of features is also much less than the number of data points (k<<N), though this need not be the case. For example, in real-time financial forecasting models, one may be interested in selecting the best predictors among all tickers for a certain type of financial security (e.g., a future or option); yet, the number of data points used in the training of the model can be much larger than the number of tickers available. More generally, for example, in the context of medical research (Genome Wide Association Studies or GWAS), the use case of the iDash competition (Track 2) on homomorphically encrypted data had N~250, k=3 and m=10,000.

In the context of a secret multi-party computation, the data of X, y and/or S may be held by multiple parties (also referred to as "players" in various ones of the applications incorporated by reference and in the references listed below) with each party maintaining some subset of the data as private (secret data) not to be shared with other parties before during or after the performance of the disclosed methods. By way of example, a party 1 can maintain all of the data X, party 2 can maintain all of the data y, and a party 3 can maintain all of the data S. In another example, each of multiple parties might maintain all of X, y and S, but only for a subset of the N data points such that the complete set of data points are maintained across all of the parties.

Consider the augmented independent matrix $X^{(i)}=[X|S_i]$ (here, $S_i$ is the ith column of S). For each index i, $1 \leq i \leq m$ consider the null hypothesis $H_0$: $\theta_{k+1}^{(i)}=0$. Here, $\theta^{(i)} = (\theta_0^{(i)}, \ldots, \theta_{k+1}^{(i)})$ denote the regression coefficients for the logistic regression model trained on $(X^{(i)}, y)$. The hypothesis $H_0$ states that if the model were trained with an arbitrarily large number of independent samples from the same distribution, the last coefficient would be zero.

One can use the p-value of the coefficients $\theta_{k+1}^{(i)}$ as a measure for the evidence against the corresponding null hypothesis $H_0$: when the p-value is small, the evidence against $H_0$ is stronger. To define the p-value, we first define the t-stat of the jth coefficient for $1 \leq j \leq k+1$ as $t_j^{(i)} := \hat{\theta}_j^{(i)}/\sigma_j^{(i)}$; here, $\hat{\theta}_j^{(i)}$ is the estimated coefficient and $\sigma_j^{(i)}$ is the standard error of the jth coefficient for the model $(X^{(i)}, y)$. The latter is easier to define in the case of linear regression models as $RSS/(\sqrt{n-k} \cdot stdev(X_i))$ where RSS is the residual sum of squares error. For logistic regression, the standard errors $\sigma_j^{(i)}$ are the square roots of the diagonal coefficients of the matrix $J^{(i)}=(H^{(i)})^{-1}$, where $H^{(i)}=(X^{(i)})^T W^{(i)} X^{(i)}$ is the Fisher information matrix (reference [3, § 13.7]). The p-value of the coefficient $\theta_{k+1}^{(i)}$ is $1-\Phi(t_{k+1}^{(i)})$, where $\Phi$ is the distribution function of the Gaussian of mean 0 and standard deviation 1.

$m(X^{(i)},y)\hat{\theta}_{k+1}^{(i)}m>>kW^{(i)}iW^{(i)} \approx W(\theta,0)\theta^{(i)}$ A naïve solution builds models, one for each external feature, and computes for each of them. Since, this is not efficient. Instead, one can use a semi-parallel approach as in reference [2] that performs a single logistic regression. Such an approach is difficult since the weights (and thus, the matrices) are different for each. A semi-parallel approach, however, can be achieved under the following two heuristic assumptions:

$$m(X^{(i)},y)\hat{\theta}_{k+1}^{(i)}m>>kW^{(i)}iW^{(i)} \approx W(\theta,0)\theta^{(i)} \qquad 1.,$$

$$m(X^{(i)},y)\hat{\theta}_{k+1}^{(i)}m>>kW^{(i)}iW^{(i)} \approx W(\theta,0)\theta(i) \qquad 2.$$

Starting from, the iterated re-weighted least squares (IRLS) method converges in one step to the final model.

FIG. 1 establishes a Proposition 1 that, based on the foregoing two assumptions, the t-statistic $t_{k+1}^{(i)}$ can be estimated to be $r_i/\sqrt{s_i}$. In this estimation, $r_i=S_i^T(y-p)$, where p is the vector of predictions for the baseline model (X,y) and $s_i=S_i^T W S_i - A_i^T H^{-1} A_i$ where $A_i=X^T W S_i$. FIG. 1 also sets out a proof of the Proposition 1.

FIG. 2 sets out a plaintext method 200 including steps 1-11, based on Proposition 1, that takes (X,y,S) as inputs and outputs a vector $(t_{k+1}^{(i)})$ of t-statistics. FIG. 3 sets out a multi-party computation implementation 300 of the method 200 that further selects an external feature based on the t-statistics. The multi-party computation implementation will now be described with reference to FIGS. 2 and 3.

In one embodiment, the multi-party computation is performed using the XOR Secret Computing Engine platform set forth in reference [1]. The XOR Secret Computing Engine platform advantageously supports: backend floating-point arithmetic or modular real arithmetic to achieve fixed-point arithmetic computations; and masking performed directly on tensors as opposed to individual numbers when performing multi-party computations. The multi-party computation can leverage secret sharing and garbled circuits where secret data is masked using a trusted dealer model.

By way of example, three parties execute might execute the method 300 in a multi-party computation implementation. X can be private data of party 1, y can be private data of party 2, and S can be private data of party 3. Parties 1 and 2, for example, may be attempting to improve a baseline model using the data of party 3, all while each party maintains the confidentiality of their private data throughout the multi-party computation. In order to maintain privacy/secrecy of party data, auxiliary masking data can be generated during a preliminary offline phase by a trusted dealer who sees neither the data nor the computation and does not collude with any of the parties. The parties can communicate via a broadcast channel during an online phase to perform the multi-party computation.

Referring to FIG. 3, at a step 310, which corresponds to steps 1-4 of method 200, the method 300 performs a (logistic) regression on the baseline feature matrix X and the dependent variable vector y to produce a coefficients vector baseline model, which can be represented by θ. Referring to FIG. 2, at a step 1, a coefficients vector θ of size k (number features) can be initialized, for example, to zero as an initial guess. At steps 2-4, a gradient descent can be iteratively executed to update the coefficients vector θ until it minimizes the (logistic) regression cost function.

In the three-party example referenced above, the regression can be computed in a multi-party computation between parties 1 and 2. In another example, the data matrix X may include data from multiple parties, each of whom seek to keep their data confidential from others of the parties. In this case, the baseline feature matrix X can be secret shared across multiple parties and the step 310 can be performed in a multi-party computation.

As shown in reference [1, § 4], an IRLS logistic regression can be directly evaluated by the XOR engine, with extended Beaver multiplication, statistical masking, and with a Fourier approximation of the sigmoid function. This improves the accuracy and the convergence rate of step 3 of the method 200.

At a step 320, which corresponds to steps 5-6 of method 200, the method 300 determines a set of numerators for a t-statistics vector. In step 5, the sigmoid function is evaluated on Xθ (the baseline feature matrix and the baseline model) to determine a vector p of predictions for the baseline model. In step 6, the transpose of the external feature matrix S is multiplied by the transpose of the difference between the dependent variable vector y and the vector p of predictions for the baseline model to produce the numerators, which can be represented as a vector r. The step 5, the step 6 or both can be performed using multi-party computation when operating on secret-shared data. The vector p and the numerators (the vector r) are intermediate values, which can be represented as a secret shared values. These secret shared values can but need not be revealed to the parties during the method 300.

It should be noted that in step 310, step 320 or both, the sigmoid function evaluation can be approximated uniformly by Fourier series in a multi-party computation. This can be done using the XOR Secret Computing Engine platform as set forth in [1, § 4].

At a step 330, which corresponds to steps 7-8 of method 200, the method 300 determines a baseline Hessian matrix based on the vector p of predictions for the baseline model and the baseline feature matrix X. As noted above, the vector p of predictions for the baseline model is also based on the baseline feature matrix X and the baseline model. The step 7, the step 8 or both can be performed using multi-party computation when operating on secret-shared data.

The baseline feature matrix X can be optionally orthogonalized prior to the step 330. In conjunction with another assumption, namely that $p_r(1-p_r) \approx 1/4$ for $1 \le r \le N$, this provides an advantage for the compute of the inverse of the Hessian matrix H. In particular, if X is orthogonal, the Hessian matrix $X^T \cdot W \cdot X \sim 1/4$ Id (Id denotes the identity matrix) which yields reasonable lower bounds on the eigenvalues. These eigenvalues can be used to determine security parameters (i.e., masking distributions) for statistical masking described in reference [1].

At a step 340, which corresponds to steps 9-10 of method 200, the method 300 determines a set of denominators for the t-statistics vector. The set of denominators, which can be represented by a vector s, is determined based on the vector p of predictions for the baseline model (in turn based on the baseline feature matrix X and the baseline model), the baseline Hessian matrix (also in turn based on the baseline feature matrix X and the baseline model), the baseline feature matrix X, and the external feature matrix S. The step 9, the step 10 or both can be performed using multi-party computation when operating on secret-shared data.

At a step 350, which corresponds to step 11 of method 200, the method 300 computes the t-statistics vector based on the numerators and the denominators of the t-statistics vector. The step 11 can be performed using multi-party computation when operating on secret-shared data. The resulting t-statistics vector can then be revealed to all or only a subset of the parties of the multi-party computation. For example, the resulting t-statistics vector can be revealed only to parties 1 and 2 who may be improving a baseline model using the data of party 3.

The t-statistics vector computed by the method can be revealed without revealing any of the intermediate steps, and the intermediate results of the steps 310, 320, 330, and 340 need not be revealed to any of the parties in the multi-party computation. Alternatively, some of the intermediate results can be revealed to the parties. By way of example, the intermediate results for the numerators and denominators of the t-statistics can be revealed after the steps 320 and 340, in which case the t-statistics vector can be computed in locally or in the clear.

At a step 360, the method 300 identifies one of the external features represented in the external feature matrix S for addition to the baseline feature matrix for the (logistic) regression model based on the t-statistics vector. The identification of the optimal external feature can be performed in accordance with known techniques.

All the operations except for $H^{-1}$ in steps 6 to 10 of the method 200 are bilinear, so they can so they can be evaluated by the Beaver-type multiplication algorithm in reference [1, § 2.2]. Inversing H in step 10 can be securely performed via statistical multiplicative masking, according to the following principle: to invert H, all parties commit to a random shares of an unknown matrix M from a suitable masking distribution, then the parties jointly reveal HM, invert it, and locally multiply the result on the left by M. The masking distribution and required precision are easy to compute if none of the eigenvalues of H are close to zero: here this guarantee follows from the fact that H is very close to 1/4 Id.

Although the methods disclosed herein are generally described with respect to logistic regression, the methods can also be adapted to be applied in the context of linear regression models and other regression models.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include one or more standalone, client and/or server computers, which can be optionally networked through wired and/or wireless networks as a networked computer system.

The special purpose software can include one or more instances thereof, each of which can include, for example, one or more of client software, server software, desktop application software, app software, database software, operating system software, and driver software. Client software be configured to operate a system as a client that sends requests for and receives information from one or more servers and/or databases. Server software can be configured to operate a system as one or more servers that receive requests for and send information to one or more clients. Desktop application software and/or app software can operate a desktop application or app on desktop and/or portable computers. Database software can be configured to operate one or more databases on a system to store data and/or information and respond to requests by client software to retrieve, store, and/or update data. Operating system software and driver software can be configured to provide an operating system as a platform and/or drivers as interfaces to hardware or processes for use by other software of a computer or computer system. By way of example, any data created, used or operated upon by the embodiments disclosed herein can be stored in, accessed from, and/or modified in a database operating on a computer system.

Figure 4:
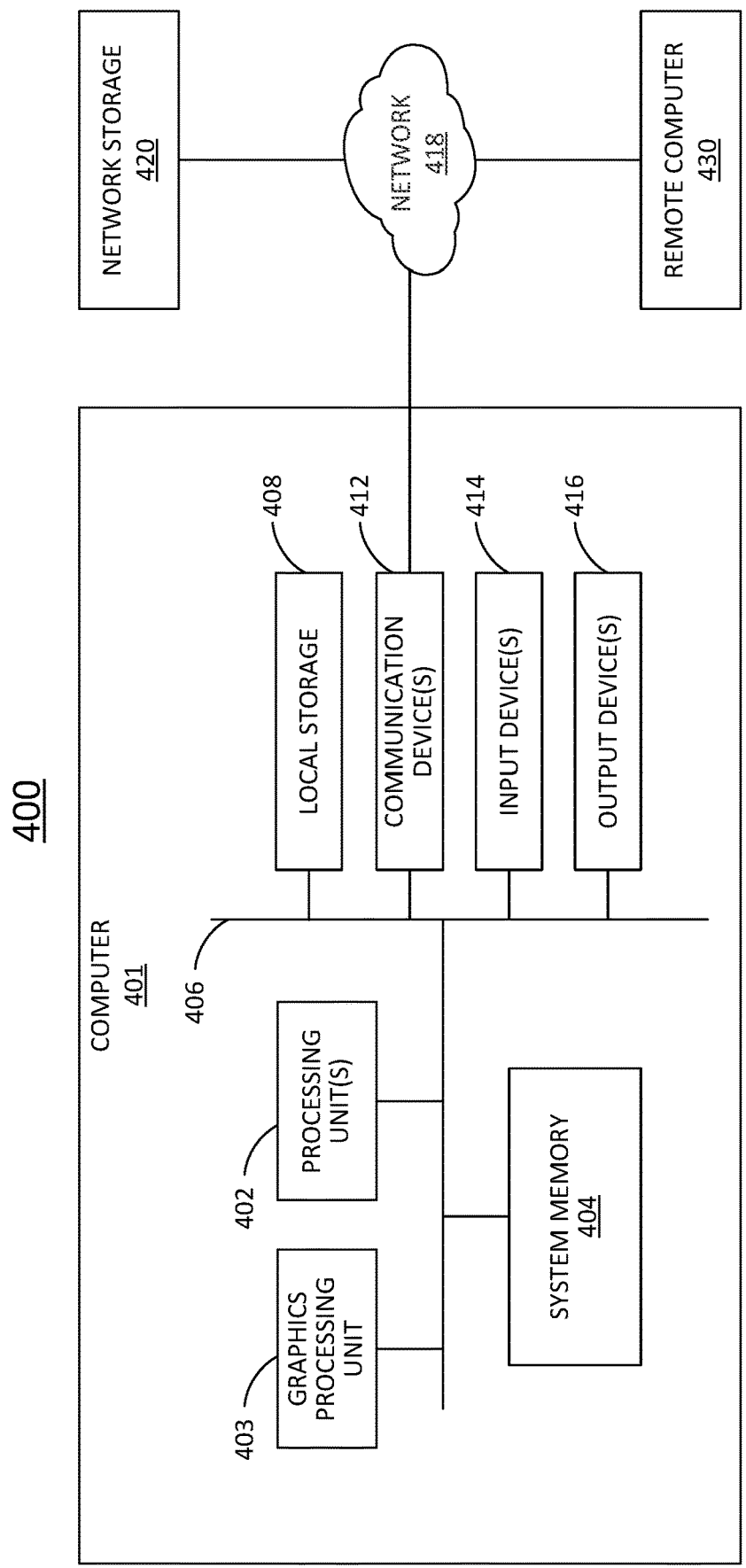
FIG. 4 illustrates a general computer architecture.

FIG. 4 illustrates a general computer architecture 400 that can be appropriately configured to implement components disclosed in accordance with various embodiments. The computing architecture 400 can include various common computing elements, such as a computer 401, a network 418, and one or more remote computers 430. The embodiments disclosed herein, however, are not limited to implementation by the general computing architecture 400.

Referring to FIG. 4, the computer 401 can be any of a variety of general purpose computers such as, for example, a server, a desktop computer, a laptop computer, a tablet computer or a mobile computing device. The computer 401 can include a processing unit 402, a system memory 404 and a system bus 406.

The processing unit 402 can be or include one or more of any of various commercially available computer processors, which can each include one or more processing cores that can operate independently of each other. Additional co-processing units, such as a graphics processing unit 403, also can be present in the computer.

The system memory 404 can include volatile devices, such as dynamic random access memory (DRAM) or other random access memory devices. The system memory 404 can also or alternatively include non-volatile devices, such as a read-only memory or flash memory.

The computer 401 can include local non-volatile secondary storage 408 such as a disk drive, solid state disk, or removable memory card. The local storage 408 can include one or more removable and/or non-removable storage units. The local storage 408 can be used to store an operating system that initiates and manages various applications that execute on the computer. The local storage 408 can also be used to store special purpose software configured to implement the components of the embodiments disclosed herein and that can be executed as one or more applications under the operating system.

The computer 401 can also include communication device(s) 412 through which the computer communicates with other devices, such as one or more remote computers 430, over wired and/or wireless computer networks 418. Communications device(s) 412 can include, for example, a network interface for communicating data over a wired computer network. The communication device(s) 412 can include, for example, one or more radio transmitters for communications over Wi-Fi, Bluetooth, and/or mobile telephone networks.

The computer 401 can also access network storage 420 through the computer network 418. The network storage can include, for example, a network attached storage device located on a local network, or cloud-based storage hosted at one or more remote data centers. The operating system and/or special purpose software can alternatively be stored in the network storage 420.

The computer 401 can have various input device(s) 414 such as a keyboard, mouse, touchscreen, camera, microphone, accelerometer, thermometer, magnetometer, or any other sensor. Output device(s) 416 such as a display, speakers, printer, or eccentric rotating mass vibration motor can also be included.

The various storage 408, communication device(s) 412, output devices 416 and input devices 414 can be integrated within a housing of the computer, or can be connected through various input/output interface devices on the computer, in which case the reference numbers 408, 412, 414 and 416 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

REFERENCES

1. C. Boura, I. Chillotti, N. Gama, D. Jetchev, S. Peceny, and A. Petric. High-precision privacy-preserving real-valued function evaluation. *IACR Cryptology ePrint Archive*, 2017:1234, 2017.
2. G. P. E. P. Sikorska K, Lesaffre E. G was on your notebook: fast semi-parallel linear and logistic regression for genome-wide association studies. *BMC Bioinformatics*, 2013.
3. L. Wasserman. *All of Statistics: A Concise Course in Statistical Inference*. Springer Publishing Company, Incorporated, 2010.

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by one or more computers operating in a secure multi-party privacy-preserving computation setting, each computer having at least one processor and a memory, the method comprising:
   accessing a set of input data comprising a baseline feature matrix, a dependent variable vector, and an external feature matrix, wherein a portion of the input data is represented as secret shared data;
   performing a regression on the baseline feature matrix and the dependent variable vector to determine a coefficients vector baseline model;
   determining numerators for a t-statistics vector based on the baseline feature matrix, the dependent variable vector, the baseline model, and the external feature matrix in a multi-party computation;
   determining denominators for the t-statistics vector based on the baseline feature matrix, the baseline model, and the external feature matrix in a multi-party computation;
   computing the t-statistics vector based on the numerators and the denominators for the t-statistics vector; and
   selecting an external feature represented in the external feature matrix for addition to the baseline feature matrix based on the t-statistics vector,
   wherein a number of rounds of communication required between parties in the multi-party computations is independent of a size of the external feature matrix.

2. The method of claim 1, further comprising:
   determining a baseline Hessian matrix based on the baseline feature matrix and the baseline model;
   wherein the determining the set of denominators is further based on the baseline Hessian matrix.

3. The method of claim 2, further comprising orthogonalizing the baseline feature matrix prior to determining the baseline Hessian matrix.

4. The method of claim 2, further comprising:
   determining a vector of predictions for the baseline model based on the baseline feature matrix and the baseline model;
   wherein the determining the baseline Hessian matrix is further based on the vector of predictions.

5. The method of claim 1, wherein the computing the t-statistics vector is performed in a multi-party computation.

6. The method of claim 1, further comprising:
   revealing the numerators for the t-statistics vector and the denominators for the t-statistics vector;
   wherein the computing the t-statistics vector is not performed in a multi-party computation.

7. The method of claim 1, wherein the regression is performed in a multi-party computation.

8. The method of claim 1, wherein the regression is not performed in a multi-party computation.

9. The method of claim 1, wherein the regression is a logistic regression.

10. The method of claim 1, wherein the regression is a linear regression.

11. The method of claim 1, wherein the number of rounds of communication required between parties in the multi-party computations is further independent of a size of the baseline feature matrix.

12. The method of claim 11, wherein the number of rounds of communication required between parties in the multi-party computations is further independent of a size of the dependent variable vector.

13. The method of claim 1, wherein the number of rounds of communication required between parties in the multi-party computations is independent of the set of input data.

14. A computer system comprising at least one processor and a memory storing instructions that cause the computer system to perform, in coordination with other computer systems operating in a secure multi-party privacy-preserving computation setting, a method comprising:
   accessing a set of input data comprising a baseline feature matrix, a dependent variable vector, and an external feature matrix, wherein a portion of the input data is represented as secret shared data;
   performing a regression on the baseline feature matrix and the dependent variable vector to determine a coefficients vector baseline model;
   determining numerators for a t-statistics vector based on the baseline feature matrix, the dependent variable vector, the baseline model, and the external feature matrix in a multi-party computation;
   determining denominators for the t-statistics vector based on the baseline feature matrix, the baseline model, and the external feature matrix in a multi-party computation;
   computing the t-statistics vector based on the numerators and the denominators for the t-statistics vector; and
   selecting an external feature represented in the external feature matrix for addition to the baseline feature matrix based on the t-statistics vector,
   wherein a number of rounds of communication required between parties in the multi-party computations is independent of a size of the external feature matrix.

15. A non-transitory computer readable medium having instructions stored thereon, wherein the instructions, when executed by a computer system having at least one processor, cause the computer system to perform, in coordination with other computer systems operating in a secure multi-party privacy-preserving computation setting, a method comprising:
- accessing a set of input data comprising a baseline feature matrix, a dependent variable vector, and an external feature matrix, wherein a portion of the input data is represented as secret shared data;
- performing a regression on the baseline feature matrix and the dependent variable vector to determine a coefficients vector baseline model;
- determining numerators for a t-statistics vector based on the baseline feature matrix, the dependent variable vector, the baseline model, and the external feature matrix in a multi-party computation;
- determining denominators for the t-statistics vector based on the baseline feature matrix, the baseline model, and the external feature matrix in a multi-party computation;
- computing the t-statistics vector based on the numerators and the denominators for the t-statistics vector; and
- selecting an external feature represented in the external feature matrix for addition to the baseline feature matrix based on the t-statistics vector,
- wherein a number of rounds of communication required between parties in the multi-party computations is independent of a size of the external feature matrix.

* * * * *